(12) United States Patent
Blaine et al.

(10) Patent No.: US 10,140,157 B2
(45) Date of Patent: Nov. 27, 2018

(54) MULTIPLE PROCESS SCHEDULING OF THREADS USING PROCESS QUEUES

(71) Applicant: Apple Inc., Cupertino, CA (US)

(72) Inventors: Russell A. Blaine, San Francisco, CA (US); Daniel A. Chimene, San Francisco, CA (US); Shantonu Sen, Mountain View, CA (US); James M. Magee, Orlando, FL (US)

(73) Assignee: Apple Inc., Cupertino, CA (US)

( * ) Notice: Subject to any disclaimer, the term of this patent is extended or adjusted under 35 U.S.C. 154(b) by 1046 days.

(21) Appl. No.: 14/290,791

(22) Filed: May 29, 2014

(65) Prior Publication Data

US 2015/0347192 A1 Dec. 3, 2015

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01); *G06F 2209/5021* (2013.01)

(58) Field of Classification Search
None
See application file for complete search history.

(56) References Cited

U.S. PATENT DOCUMENTS

| | | | | |
|---|---|---|---|---|
| 5,784,614 A | * | 7/1998 | Davis | G06F 9/4881 711/120 |
| 6,269,390 B1 | * | 7/2001 | Boland | G06F 9/4881 711/120 |
| 6,633,897 B1 | | 10/2003 | Browning et al. | |
| 7,475,399 B2 | * | 1/2009 | Arimilli | G06F 11/3466 712/216 |
| 8,032,884 B2 | * | 10/2011 | Parekh | G06F 9/4881 718/100 |
| 8,327,363 B2 | * | 12/2012 | Gopalan | G06F 9/4881 718/100 |
| 8,424,007 B1 | * | 4/2013 | Hernacki | G06F 9/485 718/103 |
| 8,544,014 B2 | * | 9/2013 | Gopalan | G06F 9/5033 718/100 |
| 8,640,140 B2 | * | 1/2014 | Waddington | G06F 9/5061 718/100 |
| 8,959,515 B2 | * | 2/2015 | Qin | G06F 9/4881 709/223 |
| 9,411,637 B2 | * | 8/2016 | Ramesh | G06F 9/4831 |
| 9,619,277 B2 | * | 4/2017 | Matsumoto | G06F 9/461 |

(Continued)

*Primary Examiner* — Van Nguyen
(74) *Attorney, Agent, or Firm* — Womble Bond Dickinson (US) LLP

(57) ABSTRACT

Techniques for scheduling threads for execution in a data processing system are described herein. According to one embodiment, in response to a request for executing a thread, a scheduler of an operating system of the data processing system accesses a global run queue to identify a global run entry associated with the highest process priority. The global run queue includes multiple global run entries, each corresponding to one of a plurality of process priorities. A group run queue is identified based on the global run entry, where the group run queue includes multiple threads associated with one of the processes. The scheduler dispatches one of the threads that has the highest thread priority amongst the threads in the group run queue to one of the processor cores of the data processing system for execution.

24 Claims, 8 Drawing Sheets

(56) References Cited

U.S. PATENT DOCUMENTS

2003/0110204 A1    6/2003  Brenner et al.
2009/0031317 A1*   1/2009  Gopalan ............... G06F 9/5033
                                                       718/103

* cited by examiner

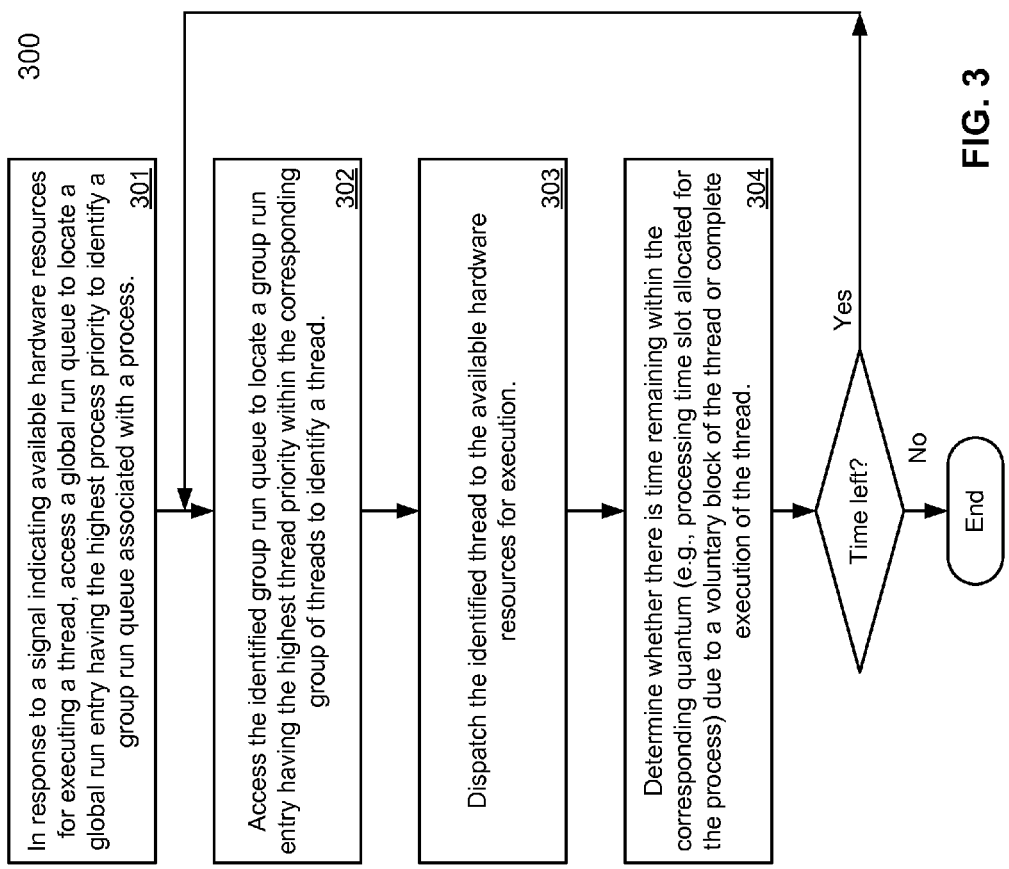

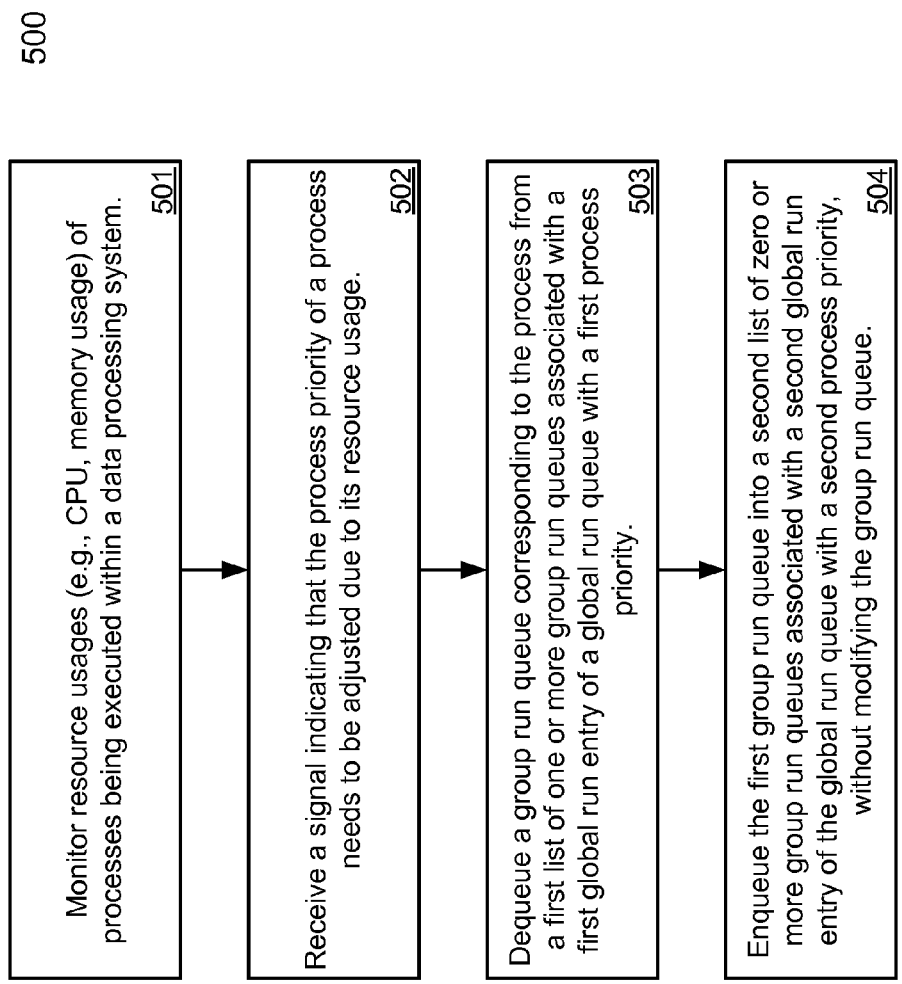

MULTIPLE PROCESS SCHEDULING OF THREADS USING PROCESS QUEUES

FIELD OF THE INVENTION

Embodiments of the present invention relate generally to thread execution. More particularly, embodiments of the invention relate to scheduling threads for execution.

BACKGROUND

An operating system (OS) is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service.

The need for a scheduling algorithm arises from the requirement for most modern systems to perform multitasking (executing more than one process at a time) and multiplexing (transmit multiple data streams simultaneously across a single physical channel). A scheduler of an operating system is concerned mainly with throughput (e.g., the total number of processes that complete their execution per time unit), latency (e.g., turnaround time-total time between submission of a process and its completion), response time (e.g., amount of time it takes from when a request was submitted until the first response is produced), fairness (e.g., equal central processing unit or CPU time to each process, or more generally appropriate times according to each process' priority and workload), and waiting time (e.g., the time the process remains in the ready queue). In practice, these goals often conflict (e.g. throughput versus latency), thus a scheduler of an operating system may implement a suitable compromise. Preference is given to any one of the above mentioned concerns depending upon the user's needs and objectives.

FIG. 1 is a block diagram illustrating a conventional task scheduling process of an operating system. Referring to FIG. 1, system 100 includes processing resources 102 as hardware resources, such as multiple processor cores 103-104 for executing multiple processes concurrently. The processes may be scheduled by scheduler 101 of an operating system using various scheduling algorithms and dispatched to processing resources 102 for execution. In this example, typically, the processes that are ready to be executed are buffered in process queue 105. Process queue 105 includes multiple entries 111-113, each corresponding one of the priorities. Each of entries 111-113 is linked with or referenced to a list of threads such as lists of threads 121-123 of different processes.

In this example, list 121 includes multiple threads 131-135 associated with processes A and process B. When a signal is received indicating that there is a process resource available, scheduler 101 walks through process queue 105 to identify an entry that is not empty and has the highest priority amongst the entries 111-113 (in this example for the purpose of illustration, priority 1 is higher than priority 2, which is higher than priority 3, and so on). In this example, scheduler 101 locates entry 111 that is not empty (e.g., with the highest priority) and retrieves list 121 of threads 131-135, where threads 131-135 have been enqueued at the tail of list 121 and dequeued at the head of list 121.

In this example, it is assumed thread 131 is dispatched for execution. When the execution of thread 131 has been completed or self-suspended, scheduler 101 will walk through process queue 105 again and find another thread for execution. In this situation, thread 132 is identified and dispatched. Since there are several threads 132-134 associated with process B before reaching thread 135 of process A in list 121, significant more threads of process B may be executed compared to process A (e.g., thread 135). As a result, the execution of threads 132-134 of process B may starve the execution of threads for process A. This will be "unfair" to process A and it may cause software decay of process A in a multi-threading system, in which a process is entitled to fair time slots for executing its associated threads.

BRIEF DESCRIPTION OF THE DRAWINGS

Embodiments of the invention are illustrated by way of example and not limitation in the figures of the accompanying drawings in which like references indicate similar elements.

FIG. 3 is a flow diagram illustrating a method for dispatch threads for execution according to one embodiment of the invention.

FIG. 5 is a flow diagram illustrating a method for adjusting process priorities for execution according to one embodiment of the invention.

DETAILED DESCRIPTION

Figure 1:
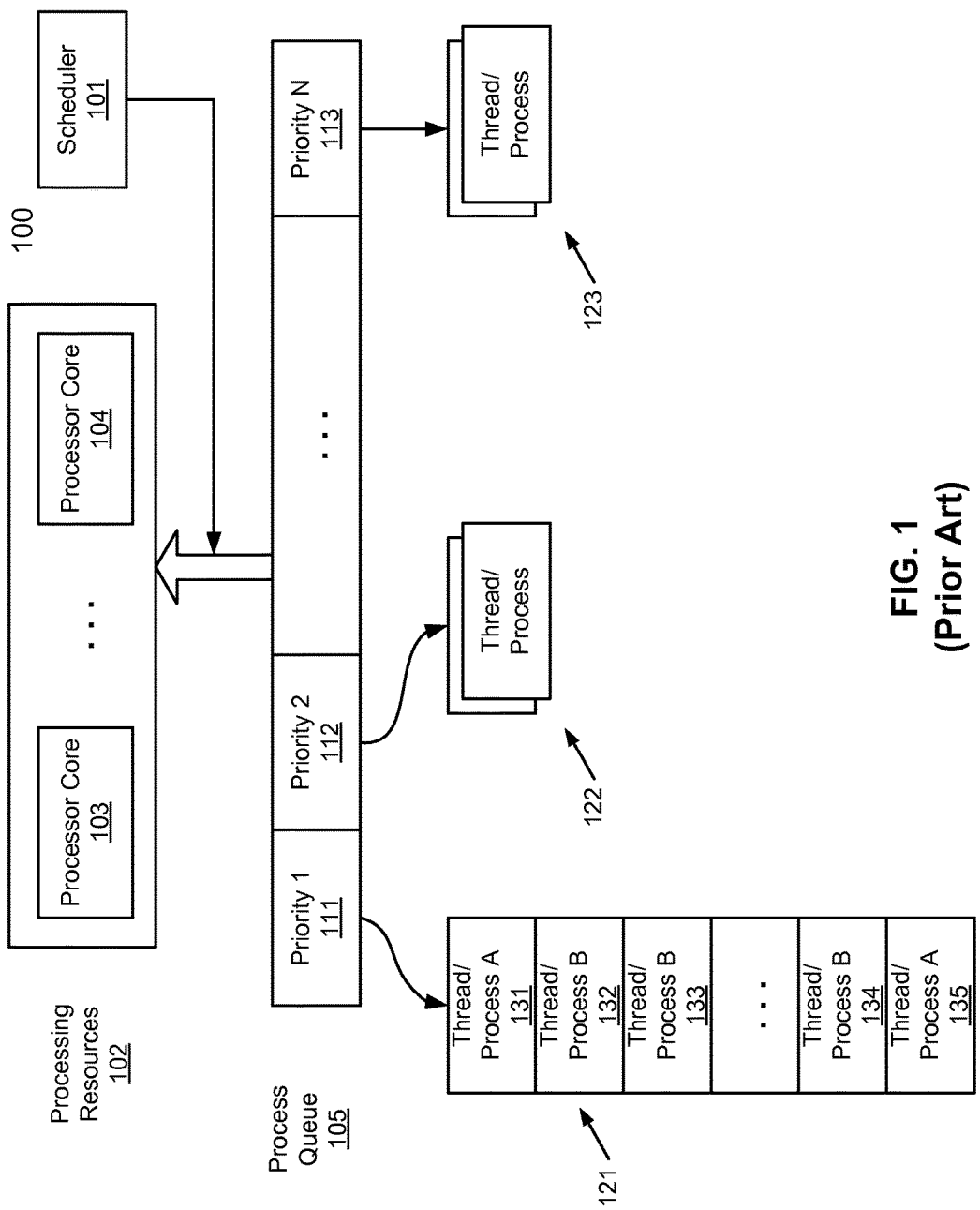
FIG. 1 is a block diagram illustrating a conventional task scheduling process of an operating system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for efficiently scheduling threads of different processes are described herein. According to one aspect of the invention, a multi-process level scheduling mechanism is utilized using a global run queue and multiple group run queues associated with different processes. In one embodiment, a single global run queue is maintained by a scheduler of an operating system. The global run queue is an array of lists of group run queues having different priorities. The global run queue includes multiple entries, each corresponding to one of process priorities for different processes to be executed by processing resources of a data processing system. Each of the entries of the global run queue is linked with or referenced to a list of zero or more group run queues. Each of the group run queues is associated with a particular process (e.g., an application being or to be executed). Each group run queue includes one or more thread entries, each thread entry corresponding to one of the thread priorities and each thread entry corresponding to zero or more threads associated with the corresponding process. The threads associated with a process may be associated with different thread priorities within the corresponding process. Each thread entry references to zero or more thread objects that store all information of the corresponding threads.

In one embodiment, in response to a signal indicating that a processing resource (e.g., processor core) becomes available, the scheduler accesses the global run queue to locate any entry or entries that are not empty, i.e., containing any process that is pending to be executed or being executed. Amongst non-empty entries, the scheduler selects one of the entries that has the highest process priority to retrieve a list of one or more group run queues, where each of the group run queues is associated with one of the processes having the highest process priority. A group run queue located at the head of the list of the group run queues is selected, for example, vie a first-in-first-out (FIFO) manner. Within the selected group run queue, the scheduler identifies an entry that is not empty and has the highest thread priority amongst the non-empty entries, selects a first of the threads listed in the identified entry, and dispatches the first thread to one of the processing resources for execution.

According to one embodiment, if the execution of the first thread is self-suspended or voluntarily suspended and there is still time remaining within the processing time slot or processing quantum corresponding to the same process, a second one of the threads associated with the same process (e.g., next in line based on its thread priority) is identified and selected from the corresponding group run queue for execution. Alternatively, if the execution of the first thread completes and there is still time remaining in the corresponding time slot, the second thread may be selected and executed. After the corresponding processing time slot or processing quantum lapses, the scheduler restarts scanning the global run queue again for identifying a next thread to be executed. As a result, a process is entitled to fully utilize its assigned processing time slot to execute as many of its threads as possible.

According to another aspect of the invention, a processing resource usage is monitored for each of the processes by monitoring logic. Based on the monitored resource usage of the processes, the priority of a process may be adjusted or modified (e.g., lower or higher) to balance the resource usages in view of other processes being executed within the data processing system. In one embodiment, if it is determined that the resource usage of a process is greater than a predetermined threshold, a group run queue of the process is dequeued from a first list of group run queues associated with a first entry of the global run queue having a first process priority. The dequeued group run queue is then and enqueued into a second list of group run queues associated with a second entry of the global queue having a second process priority. Since each of the entries in the global run queue is associated with a different process priority, the process priority of the process is literately adjusted or modified by hooking the corresponding group run queue from one entry to another within the global run queue, without having to significantly modify the information contained within the group run queue. Since the priority of some processes are adjusted, the resource usages of all processes are adjusted.

Figure 2A:
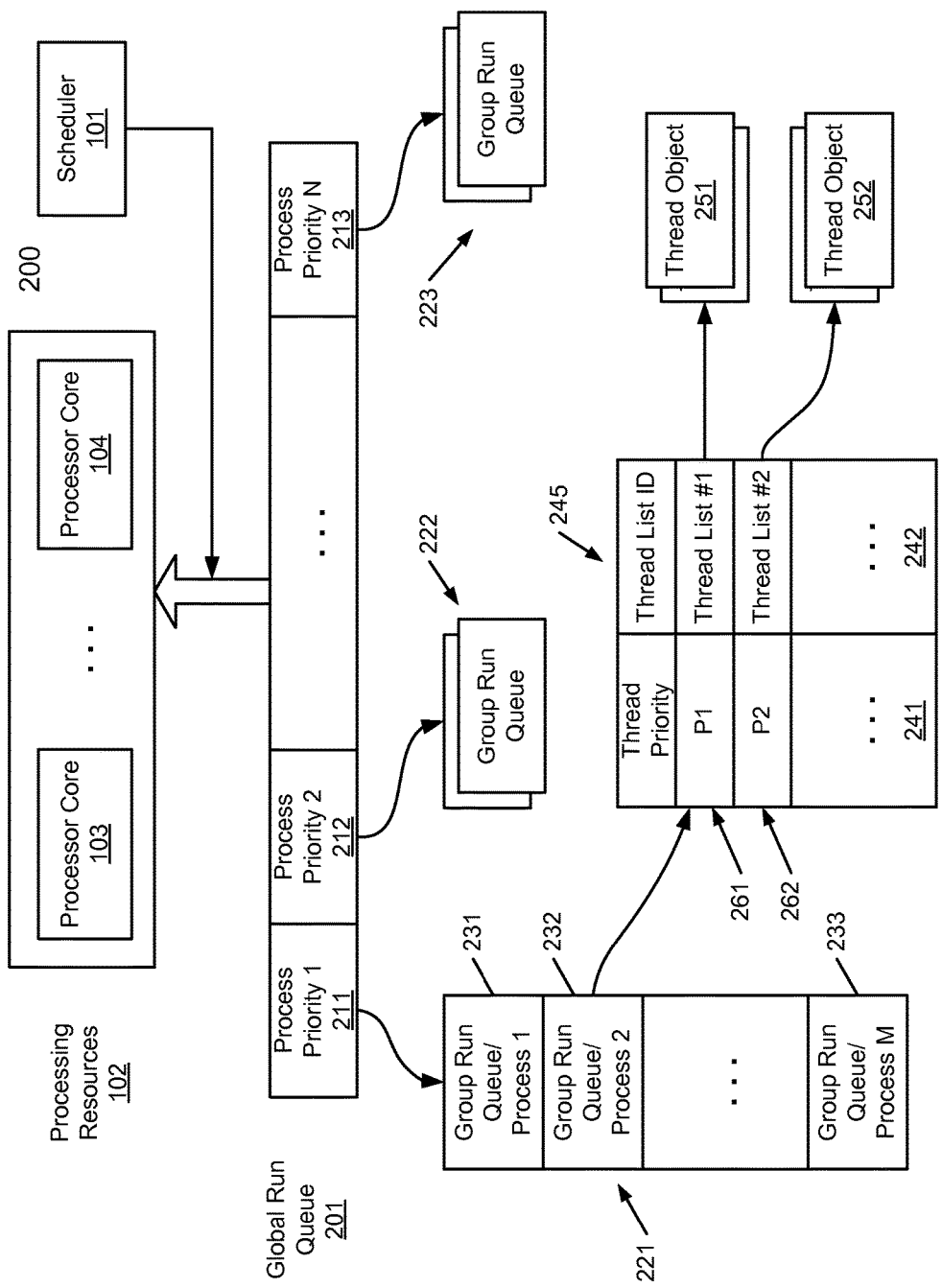
FIG. 2A is a block diagram illustrating a system for scheduling threads for execution according to one embodiment of the invention.

FIG. 2A is a block diagram illustrating a system for scheduling threads for execution according to one embodiment of the invention. Referring to FIG. 2A, system 200 represents any kind of data processing systems, such as, for example, a server, a desktop, a laptop, a tablet, or a mobile phone, etc. Processing resources 102 may present one or more processors or processor cores 103-104. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Scheduler 101 may be a part of an operating system running and executed by processing resources 102 within system 200. The operating system may be any kind of operating systems, such as, for example, iOS™ from Apple®, Android™ from Google®, Windows™ from Microsoft®, or other operating systems (e.g., UNIX, LINUX, real-time or embedded operating systems). In one embodiment, a global run queue 201 is maintained by scheduler 101 of an operating system, for example, within a system memory of the data processing system 200. Global run queue 201 is an array of lists of group run queues 221-223 having different process priorities (PPs). Global run queue 201 includes multiple entries 211-213 (also referred to herein as global run entries), each entry corresponding to one of process priorities for different processes to be executed by processing resources 102 of data processing system 200. Each of the entries 211-213 of global run queue 201 is linked with or referenced to a list of zero or more group run queues 221-223. Each of the group run queues 221-223 is associated with a particular process (e.g., an application to be executed). Each of group run queues 221-223 includes one or more thread entries corresponding to one or more threads associated with the corresponding process, where the threads may be associated with different thread priorities (TPs) within the corresponding process. Each thread entry references to a list of zero or more thread objects that store all information of the corresponding threads associated with the same thread priority.

In this example, according to one embodiment, global run queue 201 includes multiple entries 211-213, each corresponding one of the process priorities of processes to be executed by processing resources 102. The number of different priorities may be determined dependent upon a specific configuration of system 200. For the purpose of illustration, the priority corresponding to entry 211 is higher than the priority corresponding to entry 212, which is higher than the priority corresponding to entry 213, and so on. Each of entries 211-213 stores a pointer (e.g., a memory address) to a list of group run queues. In this example, entry 211 points to list 221; entry 212 points to list 222; and entry 213 points to list 223, etc. In one embodiment, each of lists 221-223 is a linked list having a chain of elements or nodes, which may be a single linked list or double linked list.

A linked list is a data structure consisting of a group of nodes which together represent a sequence. Under the simplest form, each node is composed of a datum and a reference (in other words, a link) to the next node in the sequence; more complex variants add additional links. One of the advantages of a linked list is that the list elements can easily be inserted or removed without reallocation or reorganization of the entire structure because the data items need not be stored contiguously in memory or on disk. Linked lists allow insertion and removal of nodes at any point in the list, and can do so with a constant number of operations if the link previous to the link being added or removed is maintained during list traversal.

Referring back to FIG. 2A, in this example, list 221 includes group run queues 231-233, where each of the group run queues 231-233 corresponds to one of the processes to be or being executed by processing resources 102 within system 200. In one embodiment, each of the group run queues in lists 221-223 is associated with zero or more threads of the corresponding process, where at least some of the threads may be associated with different thread priorities associated with that particular process. In this example, group run queue 232 includes or references to a list or table 245 of threads that is associated with a process corresponding to group run queue 232. In one embodiment, table 245 may include multiple entries, each entry corresponding to one of the lists of threads, each list being identified by thread list identifiers (IDs) 242 and associated with one of thread priorities 241. Each list of a particular thread priority may include zero or more threads represented by the corresponding thread objects. The entries of table or list 245 may be sorted based on thread priorities 241. In one embodiment, list or table 245 may be implemented as a linked list as well. In one embodiment, each of the thread IDs is linked with or referenced to a list of zero or more thread objects, such as thread objects 251 associated with thread priority P1 and thread objects 252 associated with thread priority P2, which stores all the information related to the corresponding thread. Multiple thread objects of the same thread priority may also be stored in a variety of data structures such as a linked list or an array. For example, a thread object may contain a memory state of the thread, a register state of the thread, a privilege of the thread, and/or other context information associated with the thread.

In one embodiment, in response to a signal indicating that at least one of processing resources 102 (e.g., processor cores 103-104) becomes available, scheduler 101 accesses global run queue 201 to locate any entry or entries that are not empty, i.e., containing any process that is pending to be or being executed. Amongst the non-empty entries, scheduler 101 selects one of the entries 211-213 that has the highest process priority to retrieve a list of one or more group run queues. A group run queue located at the head of the list is selected (e.g., using FIFO method). Within the selected group run queue, scheduler 101 identifies a list of zero or more threads that have the highest thread priority and selects a first of the threads (e.g., also referred to as group run entries), and dispatches the first thread to one of processing resources 102 for execution.

In this example, scheduler 101 determines that entry 211 is not empty and has the highest process priority amongst entries 211-213. From entry 211, scheduler 101 retrieves list 221 of group run queues 231-233. Since group run queues 231-233 were enqueued into list 211 in sequence and are associated with the same process priority, scheduler 101 may process the group run queues on a FIFO manner. In one embodiment, scheduler 101 retrieves a group run queue from the head of list 221. From the group run queue retrieved from the head, scheduler 101 selects one of the lists of the threads listed in the selected group run queue that has the highest thread priority amongst all (e.g., the list containing thread 251). The selected thread, in this example thread 251 is then dispatched, for example, by a dispatcher or dispatch logic (not shown), to processing resources 102 for execution.

Figure 2B:
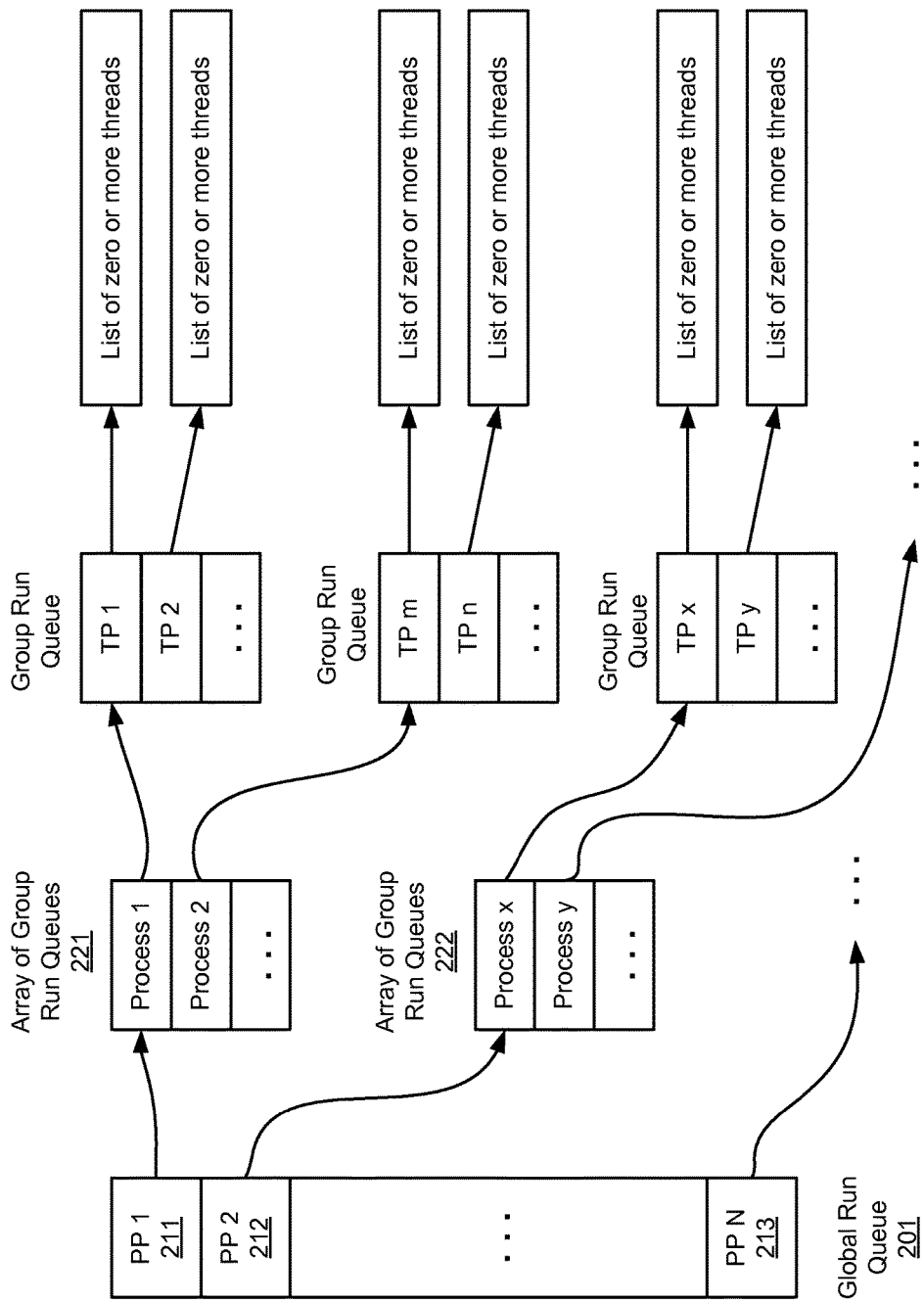
FIG. 2B is a block diagram illustrating data structures for storing process and thread information according to one embodiment of the invention.

In one embodiment, each of the group run queues 231-233 includes one or more group run entries, each group run entry being associated with a different one of the thread priorities. Each group run entry is associated with a list of zero or more threads represented by a respective thread object. For example, as shown in FIG. 2A, group run entry 261 (having a thread priority of P1) is associated with a list of zero or more threads represented by corresponding zero or more thread objects 251, while group run entry 262 (having a thread priority of P2) is associated with a list of zero or more threads represented by corresponding zero or more thread objects 252. The thread objects 251 and thread objects 252 may be stored in a variety of data structures, such as a linked list or an array, respectively. FIG. 2B is a block diagram illustrating relationships between a global run queue, group run queues, and thread objects according to one embodiment of the invention.

According to one embodiment, if the execution of the first thread (e.g., thread 251) is self-suspended or voluntarily suspended and there is still time remaining within the processing time slot or processing quantum, a second one of the threads associated with the same process (e.g., next in line based on its thread priority, thread 252) is identified and selected from the corresponding group run queue (e.g., group run queue 232 for execution. Alternatively, if the execution of the first thread completes and there is still time remaining in the corresponding time slot, the second thread may be selected and executed. After the corresponding processing time slot or processing quantum lapses, scheduler 101 restarts scanning global run queue 201 again for identifying a next thread to be executed. As a result, a process is entitled to fully utilize its assigned processing time slot to execute as many of its threads as possible.

An example of a voluntary suspension of blocking would be issuing an I/O request to a device driver and then waiting for completion to be signaled. In this case, the current thread cannot make any more forward progress, and so voluntarily blocks and the processor re-enters the scheduler to find a new thread to execute. Another example of a voluntary wait is a timed wait for a predefined period of time, e.g., in milliseconds or seconds, in which case the current thread cannot continue executing until that much time has elapsed, so the processor enters the scheduler to find another thread to execute. An example of an involuntary suspension (or preemption) would be if a high priority thread becomes runnable, and in order to balance latency of getting onto a processor resource, whatever is currently executing on that processor is forcibly evicted so that the higher priority thread can be executed on the processor. Since the higher priority thread wanting to execute is a more important input into the decision of what to run next on the processor than preserving task locality by selecting another thread in the original process running on the processor. Threads that are involuntarily suspended (or preempted) remain in the runnable state, and will attempt to execute as soon as processing resources become available again.

Note that the threads enqueued into the group run queues 221-223 are referred to as runnable threads as opposed to waiting threads. The waiting threads may be stored in another queue referred to as a waiting queue (not shown). When the state of a thread changes from a waiting state to a runnable state, the thread is dequeued from the waiting queue and enqueued into one of the group run queues dependent upon its thread priority and the associated process. A runnable thread has no constraint placed upon it, and can begin executing as soon as a processing resource is available to run it. If there are more runnable threads than processing resources (cores), the additional runnable threads are buffered, for example, in run queue data structures. A waiting thread, by contrast, cannot begin executing even if there is an available processing resource. Waiting threads are typically waiting for either an event to occur, or for some time to pass. In both of these cases (if the event occurs, or if the timeout passes), code in the wait queue subsystem finds the waiting thread, removes it from the wait queue structures, transitions the thread to runnable, and looks for a processing resource to execute the thread. If no processing resource can be found, the thread is placed in a run queue. A runnable thread can turn into a waiting thread by declaring the dependency on an event occurring or a timeout passing, and then yielding to the scheduler, which recognizes that the thread expressed an intent to wait and clears its runnable state.

FIG. 3 is a flow diagram illustrating a method for dispatch threads for execution according to one embodiment of the invention. Method 300 may be performed by processing logic which may include software, hardware, or a combination thereof. For example, method 300 may be performed by scheduler 101 of FIG. 2A. Referring to FIG. 3, at block 301, in response to a signal indicating that a processing resource is available, processing logic accesses a global run queue to locate a global run entry having the highest process priority to identify a group run queue associated with a process. The identified group run queue may be selected from a list of group run queues associated with or referenced by the located global run entry, for example, via a FIFO manner. At block 302, processing logic accesses the identified group run queue to locate a group run entry having the highest thread priority within the corresponding group of one or more threads to select a thread. At block 303, the selected thread is dispatched to the processing resources for execution. At block 304, processing logic determines whether there is still time remaining within the corresponding processing time slot or quantum due to a voluntary block or suspension of the dispatched thread. If so, the operations involved in blocks 302-303 may be iteratively performed to identify and select another thread, with either the same thread priority or a different thread priority, within the same group run queue associated with the same process for execution.

Figure 4A:
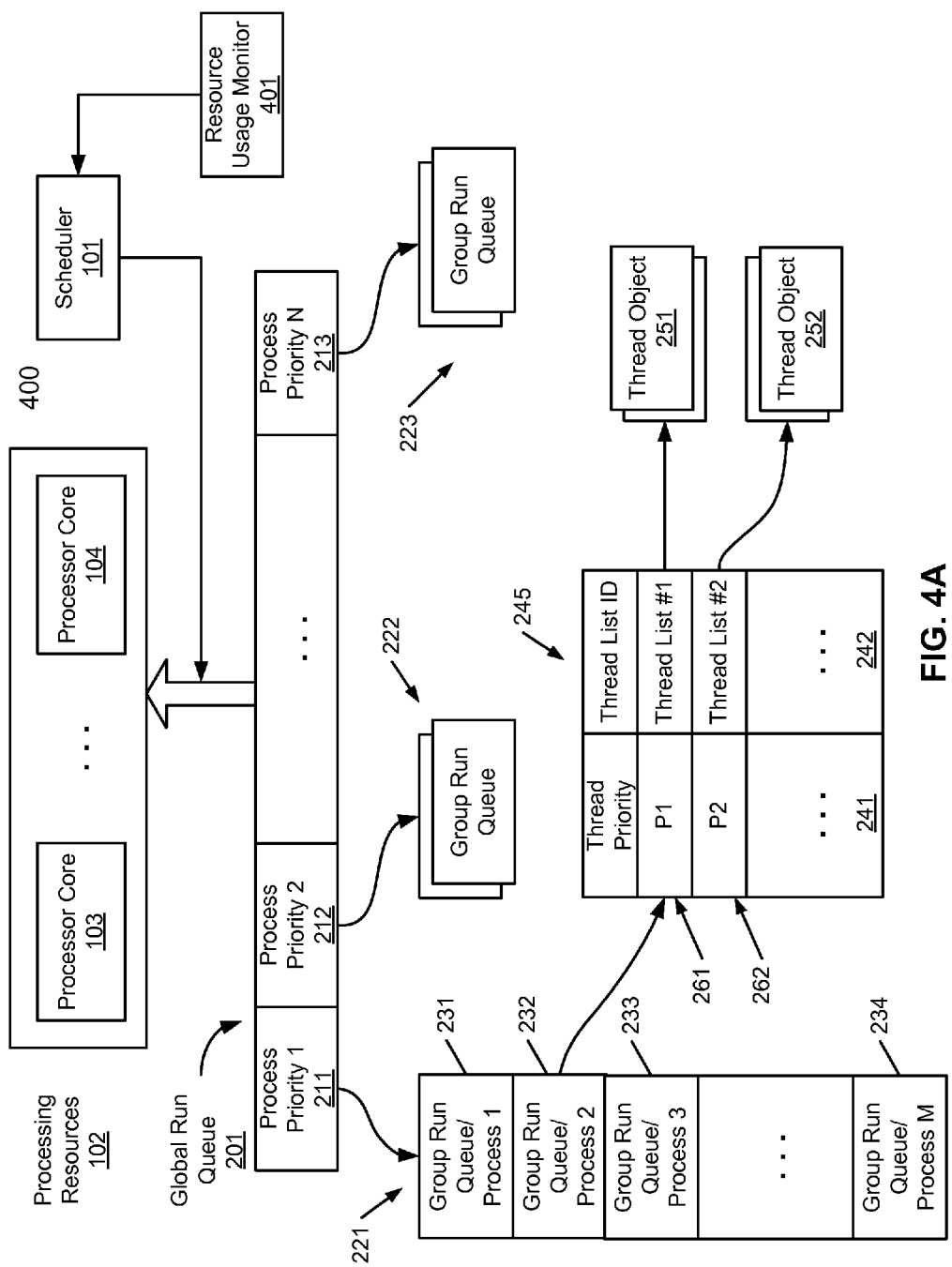
FIGS. 4A and 4B are block diagrams illustrating a system for scheduling threads for execution according to another embodiment of the invention.
Figure 4B:
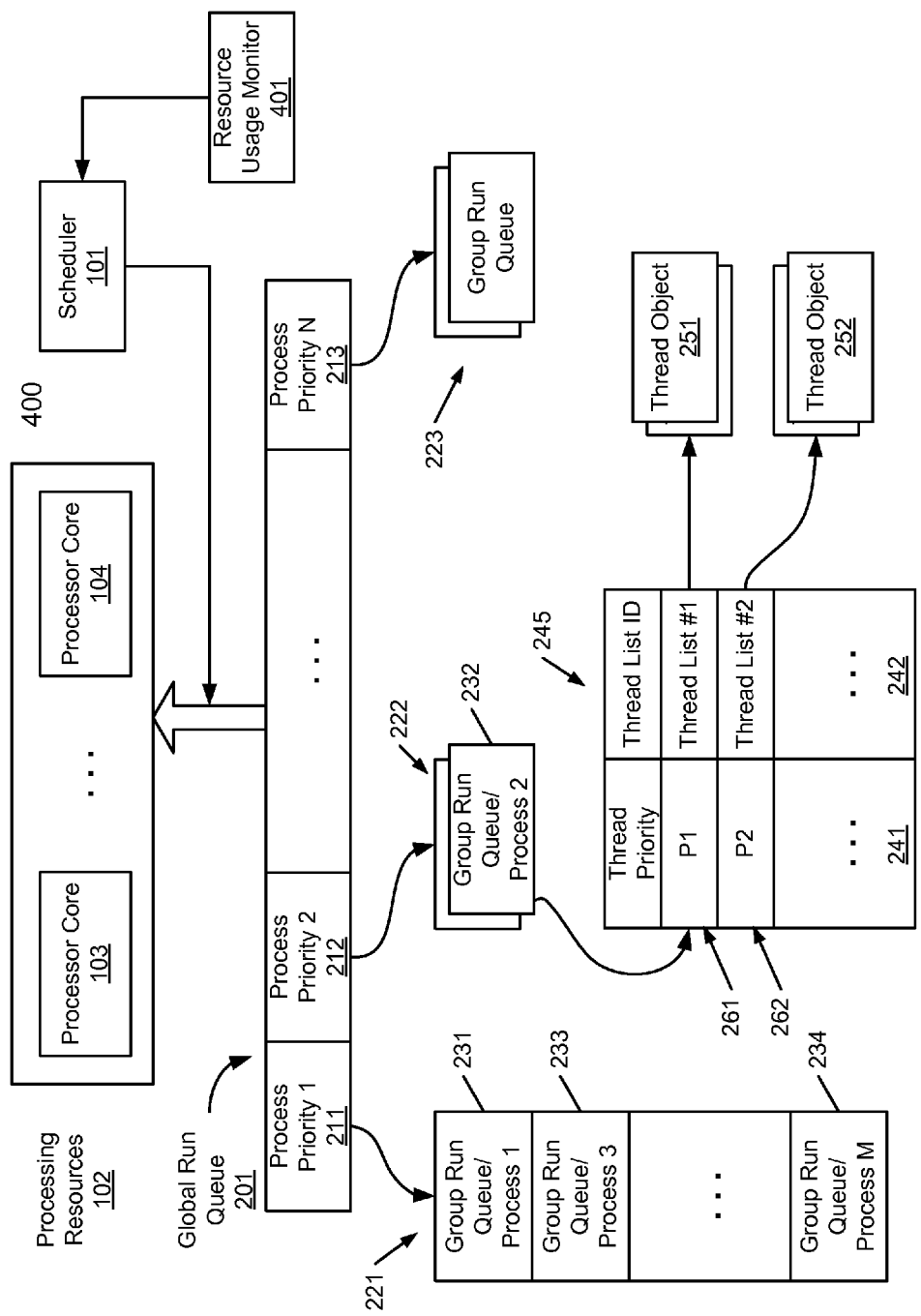

FIGS. 4A and 4B are block diagrams illustrating dispatching threads for execution according to another embodiment of the invention. System 400 may be implemented as part of system 200 of FIG. 2A. Referring to FIG. 4A, similar to system 200 of FIG. 2A, system 400 includes global run queue 201 maintained by scheduler 101. Global run queue 201 is an array of lists of group run queues 221-223 having different priorities. Global run queue 201 includes multiple entries 211-213, each entry corresponding to one of process priorities for different processes to be executed by processing resources 102 of data processing system 200. Each of the entries 211-213 of global run queue 201 is linked with or referenced to a list of zero or more group run queues 221-223. Each of the group run queues 221-223 is associated with a particular process (e.g., an application to be executed). Each of group run queues 221-223 includes one or more thread entries corresponding to one or more lists of zero or more threads associated with the corresponding process, where the threads may be associated with different thread priorities within the corresponding process. Each thread entry references to a list of zero or more thread objects that stores all information of the corresponding threads. The processes of identifying and selecting a thread for execution are similar to those described above with respect to FIGS. 2-3.

In addition, according to one embodiment, system 400 includes a resource usage monitor or monitoring logic 401 configured to monitor resource usages by all the threads and/or processes being executed and/or have been executed in the past. Resource usage monitor 401 may be implemented as part of a resource manager (not shown) of the operating system. Alternatively, resource usage monitor 401 may be integrated with scheduler 101 or other components (e.g., an application manager, daemon/agent, or kernel) of the operating system. Resource monitor 401 is configured to monitor the usage of a variety of resources, such as, for example, CPU, memory, storage, and network interface resources, etc., within a data processing system.

According to one embodiment, resource usage monitor 401 monitors the resources used by some or all of the processes being executed by processing resources 102. When the resource usage of a particular process exceeds a predetermined threshold or drops below a predetermined threshold, for example, according to a resource usage policy, resource usage monitor 401 communicates with scheduler 101 indicating that the resource usage of the process exceeds an ordinary or predetermined range. Note that different processes may have different resource usage ranges or thresholds dependent upon their respective process priorities. In response to a signal received from resource monitor 401, scheduler 101 modifies (e.g., adjusting higher or lower) the process priority of the process. For example, if the resource usage of a process exceeds a first predetermined threshold, scheduler 101 may lower the process priority of the process, such that other processes can be executed with a relatively higher process priority. Likewise, if the resource usage of the process drops below a second predetermined threshold, scheduler 101 may adjust its process priority higher.

In one embodiment, to adjust the process priority of a process, scheduler 101 dequeues or removes (a pointer or memory address of) a group run queue associate with the process from a first global run entry associated with a first process priority of global run queue 201 and enqueues or inserts (a pointer or memory address of) the group run queue into a second global run entry associated with a second process priority of global run queue 201. This is done without having to modify data stored within the group run queue. Since each of the global run entries of global run queue 201 is associated with a different process priority, by simply relocating a group run queue of the process from one entry to another, the process priority of the process is literately modified, without having to modify the content of the group run queue.

Referring back to FIG. 4A, in this example, it is assumed that the process priority of group run queue 245 of group run entry 232 associated with global run entry 211 needs to be adjusted based on the resource usage of its corresponding process. In response, group run group 245 is then dequeued or removed from list 221 and enqueued or inserted into list 222, as shown in FIG. 4B. That is, in order to adjusting the process priority of a process associated with group run queue 245, scheduler 101 removes a pointer or memory address of group run queue 245 from list 221 and inserts the pointer or memory address of group run queue 245 into list 222 as entry 232 (for example, at the tail of list 222), without having to modify data stored within group run queue 245. This makes the process of adjusting the process priorities much simpler and efficient.

FIG. 5 is a flow diagram illustrating a method for adjusting process priorities for execution according to one embodiment of the invention. Method 500 may be performed by processing logic which may include software, hardware, or a combination thereof. For example, method 500 may be performed by system 400 of FIGS. 4A-4B. Referring to FIG. 5, at block 501, resource usages of processes being executed within a data processing system are monitored, for example, by resource usage monitor 401 of FIGS. 4A-4B. At block 502, processing logic receives a signal indicating that the process priority of a process needs to be adjusted due to its resource usage. At block 503, processing logic dequeues a group run queue corresponding to the process from a first list of one or more group run queues associated with a first global run entry of a global run queue. The first global run entry is associated with a first process priority. At block 504, processing logic enqueues the group run queue into a second list of zero or more group run queues associated with a second global run entry of the global run queue, without modifying the group run queue. The second global run entry is associated with a second process priority that is different than the first process priority.

Figure 6:
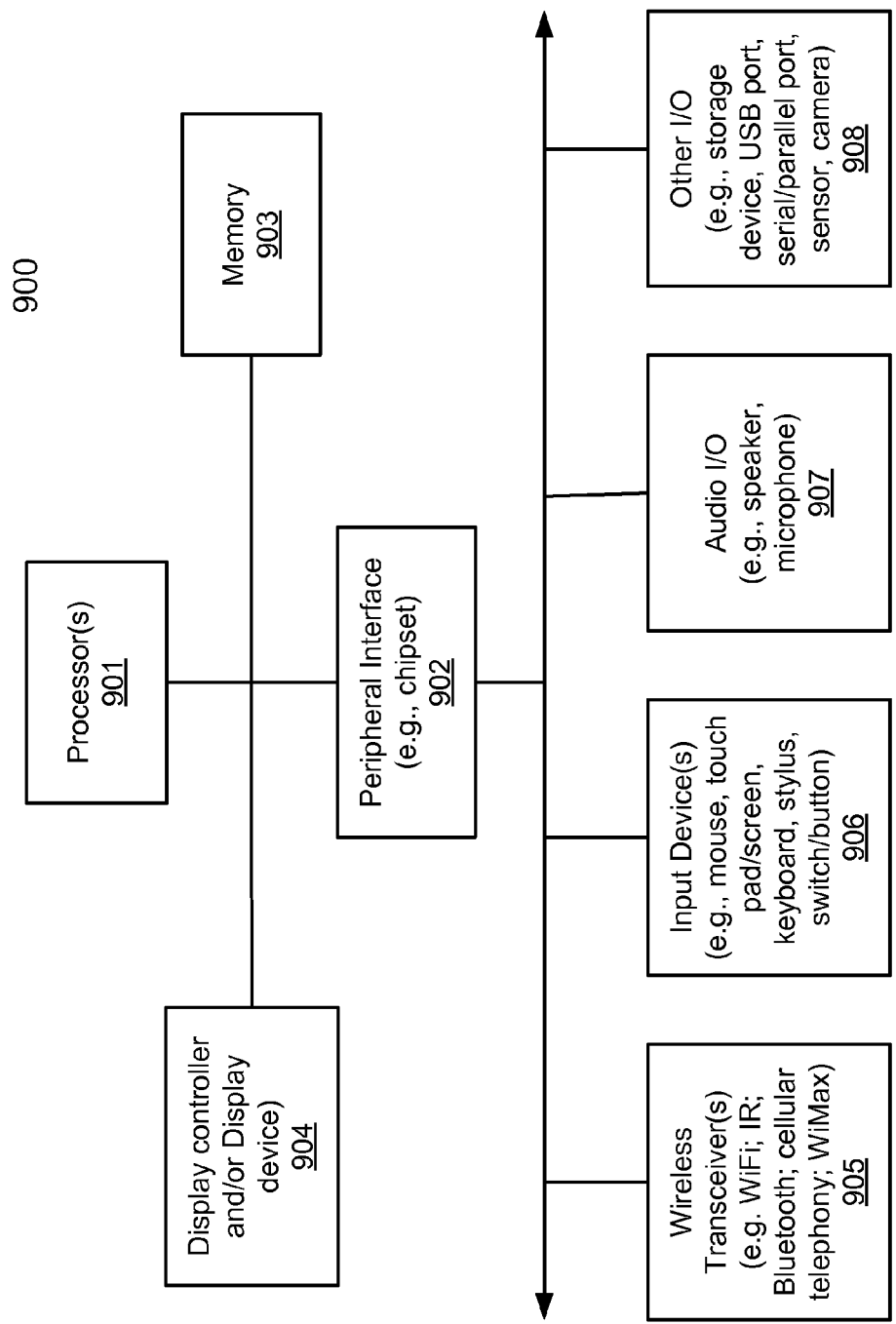
FIG. 6 is a block diagram illustrating an example of a data processing system which may be used with one embodiment of the invention.

FIG. 6 is a block diagram illustrating an example of a data processing system which may be used with one embodiment of the invention. System 900 may represents any of data processing systems described above performing any of the processes or methods described above. For example, system 900 may represent system 200 and/or system 400 as described above. Scheduler 101, as well as the associated operating system, may be executed in a system memory, such as memory 903 of system 900. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 6, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
in response to a request for executing a thread, accessing, by a scheduler of an operating system of a data processing system, a global run queue to identify a global run entry associated with a highest process priority, wherein the global run queue includes a plurality of global run entries, each corresponding to one of a plurality of process priorities;
identifying a first group run queue based on the global run entry, the first group run queue having a plurality of threads and the first group run queue is associated with a first of a plurality of processes different from a second group run queue of the global run entry being associated with a second of the plurality of processes; and
dispatching one of the threads that has a highest thread priority amongst the threads in the first group run queue to one of a plurality of processor cores of the data processing system for execution.

2. The method of claim 1, wherein each of the global run entries of the global run queue is associated with a list of a plurality of group run queues, each of the group run queues is associated with one of the processes running within the data processing system.

3. The method of claim 2, wherein each of the group run queues includes a list of a plurality of threads associated with a corresponding process, each of the threads being associated with one of a plurality of thread priorities associated with the corresponding process.

4. The method of claim 3, further comprising:
monitoring processing resource usages amongst all processes being executed by the processor cores of the data processing system; and
modifying priorities of group run queues based on processing resource usages of the corresponding processes, such that one process does not utilize too many process resources that will starve another process.

5. The method of claim 4, wherein modifying priorities of group run queues comprises:
identifying a third group run queue of a first global run entry that has a processing resource usage greater than a predetermined threshold;
dequeuing the third group run queue from the first global run entry of the global run queue, the first global run entry having a first process priority; and
enqueuing the third group run queue to a second global run entry of the global run queue, without modifying the third group run queue, wherein the second global run entry has a second process priority.

6. The method of claim 5, wherein the first process priority is higher than the second process priority.

7. The method of claim 1, wherein each of the processor cores is configured to execute one or more threads of a particular process within a predetermined time slot.

8. The method of claim 7, wherein dispatching one of the threads that has the highest thread priority amongst the threads in the first group run queue to one of a plurality of processor cores of the data processing system for execution comprises:

dispatching a first of the threads of the first group run queue to a first of the processor cores for execution;

in response to a signal indicating that the first thread has been suspended, determining whether there is still time remaining within a first time slot associated with the process associated with the first group run queue; and dispatching a second of the threads of the first group run queue to the first processor core for execution if there is still time remaining within the first time slot associated with the process.

9. A non-transitory computer-readable medium having instructions stored therein, which when executed by a computer, cause the computer to perform a method, the method comprising:

in response to a request for executing a thread, accessing, by a scheduler of an operating system of a data processing system, a global run queue to identify a global run entry associated with a highest process priority, wherein the global run queue includes a plurality of global run entries, each corresponding to one of a plurality of process priorities;

identifying a first group run queue based on the global run entry, the first group run queue having a plurality of threads and the first group run queue is associated with a first of a plurality of processes different from a second group run queue of the global run entry being associated with a second of the plurality of processes; and dispatching one of the threads that has a highest thread priority amongst the threads in the first group run queue to one of a plurality of processor cores of the data processing system for execution.

10. The non-transitory computer-readable medium of claim 9, wherein each of the global run entries of the global run queue is associated with a list of a plurality of group run queues, each of the group run queues is associated with one of the processes running within the data processing system.

11. The non-transitory computer-readable medium of claim 10, wherein each of the group run queues includes a list of a plurality of threads associated with a corresponding process, each of the threads being associated with one of a plurality of thread priorities associated with the corresponding process.

12. The non-transitory computer-readable medium of claim 11, wherein the method further comprises:

monitoring processing resource usages amongst all processes being executed by the processor cores of the data processing system; and modifying priorities of group run queues based on processing resource usages of the corresponding processes, such that one process does not utilize too many process resources that will starve another process.

13. The non-transitory computer-readable medium of claim 12, wherein modifying priorities of group run queues comprises:

identifying a third group run queue of a first global run entry that has a processing resource usage greater than a predetermined threshold;

dequeuing the third group run queue from the first global run entry of the global run queue, the first third global run entry having a first process priority; and enqueuing the third group run queue to a second global run entry of the global run queue, without modifying the third group run queue, wherein the second global run entry has a second process priority.

14. The non-transitory computer-readable medium of claim 13, wherein the first process priority is higher than the second process priority.

15. The non-transitory computer-readable medium of claim 9, wherein each of the processor cores is configured to execute one or more threads of a particular process within a predetermined time slot.

16. The non-transitory computer-readable medium of claim 15, wherein dispatching one of the threads that has the highest thread priority amongst the threads in the first group run queue to one of a plurality of processor cores of the data processing system for execution comprises:

dispatching a first of the threads of the first group run queue to a first of the processor cores for execution;

in response to a signal indicating that the first thread has been suspended, determining whether there is still time remaining within a first time slot associated with the process associated with the first group run queue; and dispatching a second of the threads of the first group run queue to the first processor core for execution if there is still time remaining within the first time slot associated with the process.

17. A data processing system, comprising:

a processor having one or more processor cores; and a memory coupled to the processor for storing instructions, which when executed by the processor, cause the processor to perform operations, the operations including in response to a request for executing a thread, accessing, by a scheduler of an operating system executed from the memory, a global run queue to identify a global run entry associated with a highest process priority, wherein the global run queue includes a plurality of global run entries, each corresponding to one of a plurality of process priorities, identifying a first group run queue based on the global run entry, the first group run queue having a plurality of threads and the first group run queue is associated with a first of a plurality of processes different from a second group run queue of the global run entry being associated with a second of the plurality of processes, and dispatching one of the threads that has a highest thread priority amongst the threads in the first group run queue to one of a plurality of processor cores of the data processing system for execution.

18. The system of claim 17, wherein each of the global run entries of the global run queue is associated with a list of a plurality of group run queues, each of the group run queues is associated with one of the processes running within the data processing system.

19. The system of claim 18, wherein each of the group run queues includes a list of a plurality of threads associated with a corresponding process, each of the threads being associated with one of a plurality of thread priorities associated with the corresponding process.

20. A computer-implemented method, comprising:

monitoring processing resource usages of a plurality of processes being executed within a data processing system, each of the processes being associated with one of a plurality of process priorities;

receiving a signal indicating that a process priority of a first of the processes needs to be adjusted due to its processing resource usage;

dequeuing a first group run queue corresponding to the first process from a first list of one or more group run queues associated with a first global run entry of a global run queue, wherein the first process is different from a second process corresponding to a second group run queue from the first list of one or more group run queues; and enqueuing the first group run queue into a second list of zero or more group run queues associated with a second global run entry of the global run queue without modifying the first group run queue, wherein the global run queue includes a plurality of global run entries, each corresponding to one of the process priorities.

21. The method of claim 20, wherein each of the global run entries is associated with a list of zero or more group run queues, each group run queue being associated with one of the plurality of processes.

22. The method of claim 21, wherein each of the group run queue includes a list of one or more threads that are associated with a process corresponding to the group run queue.

23. The method of claim 22, wherein each of the one or more threads is associated with one of a plurality of thread priorities of the process corresponding to the group run queue.

24. A computer-implemented method, comprising:

in response to a receiving a request to execute a thread, identifying, by a scheduler of an operating system of a data processing system, a global run entry associated with a highest process priority within a global run queue, wherein each global run entry includes a group run queue and each group run entry within the group run queue is associated with a particular process;

identifying a group run entry based on the identified global run entry, wherein the group run entry includes a set of threads for the particular process associated with the identified group run entry and each thread is associated with a thread priority;

dispatching a first thread with a highest thread priority amongst the set of threads in the identified group run entry to a first processor amongst a set of processors of the data processing system for execution; and in response to a signal indicating that the first thread has been suspended, dispatching a second thread amongst the set of threads in the identified group run entry to the first processor for execution if there is still time remaining within a time slot associated with the particular process associated with the identified group run entry.

* * * * *